United States Patent
Cao et al.

(10) Patent No.: US 11,216,120 B2
(45) Date of Patent: Jan. 4, 2022

(54) TOUCH PANEL AND DRIVING METHOD THEREOF, AND TOUCH DEVICE

(71) Applicant: BOE TECHNOLOGY GROUP CO., LTD., Beijing (CN)

(72) Inventors: Xueyou Cao, Beijing (CN); Haisheng Wang, Beijing (CN); Xiaoliang Ding, Beijing (CN); Yanling Han, Beijing (CN); Chih Jen Cheng, Beijing (CN); Wei Liu, Beijing (CN); Pengpeng Wang, Beijing (CN); Ping Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 573 days.

(21) Appl. No.: 16/080,077

(22) PCT Filed: Feb. 5, 2018

(86) PCT No.: PCT/CN2018/075247
§ 371 (c)(1),
(2) Date: Aug. 27, 2018

(87) PCT Pub. No.: WO2019/007056
PCT Pub. Date: Jan. 10, 2019

(65) Prior Publication Data
US 2021/0200412 A1    Jul. 1, 2021

(30) Foreign Application Priority Data

Jul. 4, 2017  (CN) .......................... 201710535984.7

(51) Int. Cl.
*G06F 3/041*  (2006.01)
*G06F 3/044*  (2006.01)
*H01Q 7/00*  (2006.01)

(52) U.S. Cl.
CPC ............ *G06F 3/044* (2013.01); *G06F 3/0412* (2013.01); *G06F 3/04166* (2019.05); *H01Q 7/00* (2013.01)

(58) Field of Classification Search
CPC .... G06F 3/0412; G06F 3/04166; G06F 3/044; H01Q 7/00
See application file for complete search history.

(56) References Cited

U.S. PATENT DOCUMENTS 9,178,572 B1 * 11/2015 Zhang .................. H04B 5/0012
2007/0205291 A1 * 9/2007 Aramaki .................. H01Q 7/00
235/492

(Continued)

FOREIGN PATENT DOCUMENTS

| CN | 101719039 A | 6/2010 |
|---|---|---|
| CN | 102654801 A | 9/2012 |

(Continued)

OTHER PUBLICATIONS

PCT International Search Report, Application No. PCT/CN2018/075247, dated Apr. 26, 2018, 6 pages: with English translation.

(Continued)

*Primary Examiner* — Hong Zhou
(74) *Attorney, Agent, or Firm* — Armstrong Teasdale LLP (57) ABSTRACT

Embodiments of the present disclosure provide a touch panel and a driving method thereof, and a touch device. The touch panel includes a plurality of touch electrodes and at least one first switch element. Each of the at least one first switch element is provided between two touch electrodes of the plurality of touch electrodes, and is configured to be turned on according to a first signal from a first signal terminal such that the corresponding touch electrodes among the plurality of touch electrodes are connected via the at least one one first switch element to form a coil.

13 Claims, 6 Drawing Sheets

(56) References Cited

U.S. PATENT DOCUMENTS

| | | | | |
|---|---|---|---|---|
| 2008/0001825 | A1* | 1/2008 | Kurokawa | G06K 19/07749 343/700 MS |
| 2008/0265987 | A1* | 10/2008 | Yamazaki | H04B 1/06 329/370 |
| 2010/0271314 | A1 | 10/2010 | Rofougaran | |
| 2014/0232325 | A1* | 8/2014 | Jung | G09G 3/3648 320/107 |
| 2014/0285468 | A1* | 9/2014 | Liao | H04B 5/0075 345/174 |
| 2016/0048711 | A1* | 2/2016 | Ren | G06K 19/0723 340/10.34 |
| 2018/0188838 | A1* | 7/2018 | An | G06F 3/0446 |
| 2019/0036208 | A1* | 1/2019 | Yamagishi | G06K 19/0723 |

FOREIGN PATENT DOCUMENTS

| | | |
|---|---|---|
| CN | 103677469 A | 3/2014 |
| CN | 104199576 A | 12/2014 |
| CN | 107329621 A | 11/2017 |
| JP | 5703895 B2 | 4/2015 |

OTHER PUBLICATIONS

PCT Written Opinion, Application No. PCT/CN2018/075247, dated Apr. 26, 2018, 7 pages.: with English translation of relevant part.
China First Office Action, Application No. 201710535984.7, dated Mar. 1, 2019, 19 pps.: with English translation.

* cited by examiner

TOUCH PANEL AND DRIVING METHOD THEREOF, AND TOUCH DEVICE

CROSS REFERENCE TO RELATED APPLICATIONS

This patent application is a National Stage Entry of PCT/CN2018/075247 filed on Feb. 5, 2018, which claims the benefit and priority of Chinese Patent Application No. 201710535984.7 filed on Jul. 4, 2017, the disclosures of which are incorporated herein by reference in their entirety as part of the present application.

BACKGROUND

The present disclosure relates to the field of touch display technologies, and in particular, to a touch panel and a driving method thereof, and a touch device.

Touch panels can be classified into resistive and capacitive types according to different sensing technologies. Nowadays, capacitive touch panels are widely used in electronic products. The capacitive touch panel works by utilizing current sensing of the human body, and senses touch signals by utilizing electrodes in combination with human body characteristics. When the human body (finger) touches a screen, due to the electric field of the human body, coupling capacitance is formed between the finger and a conductor layer of the touch screen. Current generated by the electrode on the touch screen then flows to the touch point, so that the position of the touch point can be accurately determined in time.

Antennas are used for transmitting or receiving radio waves so as to transmit or exchange radio signals. Electronic products with wireless network communication functions (such as mobile phones, etc.) typically transmit or receive wireless signals through built-in antennas for transmission of related data. At present, antennas of mobile phones mostly have plate-like structures and are provided within the casing of mobile phones.

BRIEF DESCRIPTION

Embodiments of the present disclosure provide a touch panel and a driving method thereof, and a touch device.

A first aspect of the present disclosure provides a touch panel. The touch panel may include a plurality of touch electrodes and at least one first switch element. Each of the at least one first switch element is provided between two touch electrodes of the plurality of touch electrodes, and is configured to be turned on according to a first signal from a first signal terminal, such that the corresponding touch electrodes among the plurality of touch electrodes are connected via the at least one first switch element to form a coil.

In an embodiment of the present disclosure, the touch panel may further include a rectifying circuit configured to rectify, according to a second signal from a second signal terminal, a signal sensed by the coil. A first input terminal of the rectifying circuit is coupled to a first terminal of the coil, a second input terminal of the rectifying circuit is coupled to a second terminal of the coil, and an output terminal of the rectifying circuit is configured to output the rectified signal.

In an embodiment of the present disclosure, the rectifying circuit may include a switch sub-circuit and a rectifying sub-circuit. The switch sub-circuit is configured to couple the first terminal of the coil to the rectifying sub-circuit according to the second signal. The rectifying sub-circuit is configured to rectify the signal sensed by the coil according to the second signal.

In an embodiment of the present disclosure, the switch sub-circuit may include a second switch element. A control electrode of the second switch element is coupled to the second signal terminal, a first electrode of the second switch element is coupled to the first terminal of the coil, and a second electrode of the second switch element is coupled to the rectifying sub-circuit.

In an embodiment of the present disclosure, the rectifying sub-circuit may include a first diode, a first capacitor, a second diode, and a second capacitor. An anode of the first diode is coupled to the switch sub-circuit, and a cathode of the first diode is coupled to an output terminal of the rectifying circuit. A first end of the first capacitor is coupled to the cathode of the first diode, and a second end of the first capacitor is coupled to the second terminal of the coil. An anode of the second diode is coupled to the cathode of the first diode, and a cathode of the second diode is coupled to the switch sub-circuit. A first end of the second capacitor is coupled to the anode of the second diode, and a second end of the second capacitor is coupled to the second terminal of the coil.

In an embodiment of the present disclosure, the rectifying sub-circuit further includes a third switch element and a fourth switch element. A control electrode of the third switch element is coupled to the second signal terminal, a first electrode of the third switch element is coupled to the cathode of the first diode, and a second electrode of the third switch element is coupled to the first end of the first capacitor. A control electrode of the fourth switch element is coupled to the second signal terminal, a first electrode of the fourth switch element is coupled to the anode of the second diode, and a second electrode of the fourth switch element is coupled to the first end of the second capacitor.

In an embodiment of the present disclosure, the first diode and the second diode are provided outside a touch area of the touch panel.

In an embodiment of the present disclosure, the touch panel may further include a display circuit. At least one of the first switch element, the second switch element, the third switch element, and the fourth switch element is a switch element in the display circuit.

In an embodiment of the present disclosure, at least one of the first switch element, the second switch element, the third switch element, and the fourth switch element may be a transistor.

In an embodiment of the present disclosure, the touch panel may further include a processing circuit. The processing circuit is configured to process a signal outputted by the rectifying circuit. A first input terminal of the processing circuit is coupled to the output terminal of the rectifying circuit, a second input terminal of the processing circuit is coupled to the second terminal of the coil, and an output terminal of the processing circuit is configured to output the processed signal.

In an embodiment of the present disclosure, the touch electrode is a self-capacitive touch electrode.

In an embodiment of the present disclosure, the plurality of touch electrodes includes a plurality of driving touch electrodes and a plurality of sensing touch electrodes. Each of the at least one first switch element is provided between two driving touch electrodes, between two sensing touch electrodes, or between one driving touch electrode and one sensing touch electrode.

In an embodiment of the present disclosure, at least some of the plurality of driving touch electrodes are connected through signal lines. At least some of the plurality of sensing touch electrodes are connected through signal lines.

A second aspect of the present disclosure provides a method for driving the touch panel according to the first aspect of the present disclosure described above. In the method, in a first time period, a touch signal is applied to a touch electrode, and a first signal is applied to the first signal terminal, such that the touch panel can perform a touch function, wherein the first signal is an invalid signal. In a second time period, a first signal is provided to the first signal terminal, and the corresponding touch electrodes in the touch panel are connected so as to form a coil, wherein the first signal is a valid signal.

In an embodiment of the present disclosure, the method may further include providing a second signal to the second signal terminal in the first time period, wherein the second signal is an invalid signal, and providing a second signal to the second signal terminal in the second time period, wherein the second signal is a valid signal.

A third aspect of the present disclosure provides a touch device. The touch device may include the touch panel according to the first aspect of the present disclosure described above.

BRIEF DESCRIPTION OF THE DRAWINGS

In order to illustrate the technical solutions of the present disclosure more clearly, the drawings of the embodiments will be briefly described below. It should be appreciated that the drawings described below are only related to some of the embodiments of the present disclosure, rather than limiting the present disclosure, in which.

DETAILED DESCRIPTION

In order to make the technical solutions and advantages of the embodiments of the present disclosure clearer, the technical solutions of the embodiments of the present disclosure will be clearly and completely described below in conjunction with the accompanying drawings. Apparently, the described embodiments are merely part of the embodiments of the present disclosure, rather than all of the embodiments. According to the described embodiments, all the other embodiments obtained by those of ordinary skill in the art without creative labor also fall within the scope of protection of the present disclosure.

In the following text, the expression "the element A is coupled/connected to the element B" means that the element A is "directly" connected to the element B or "indirectly" connected to the element B through one or more other elements, unless otherwise stated.

Figure 1A:
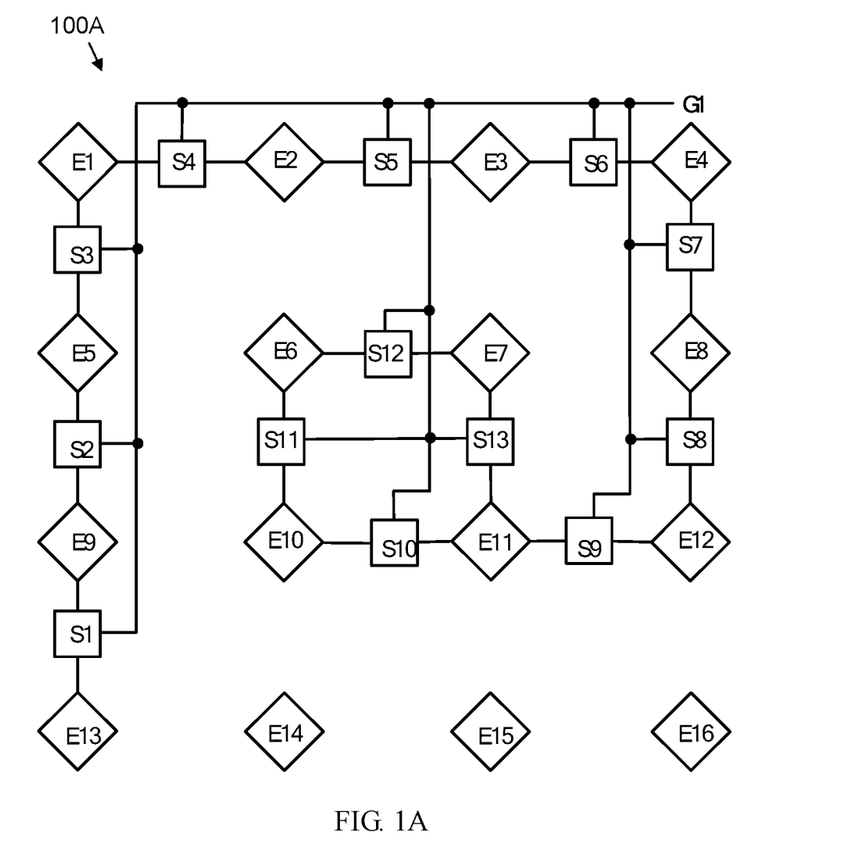
FIG. 1A is a schematic diagram of a touch panel according to an embodiment of the present disclosure.

FIG. 1A shows a schematic diagram of a touch panel 100A according to an embodiment of the present disclosure. As shown in FIG. 1A, the touch panel is provided with a plurality of touch electrodes and at least one first switch element. In this example, the touch panel is provided with 16 touch electrodes E1-E16 and 13 first switch elements S1-S13. In FIG. 1A, the touch electrodes E1-E16 are represented by diamonds, and the first switch elements S1-S13 are represented by squares.

In the present example, the first switch elements S1-S13 are respectively provided between two touch electrodes. Referring to FIG. 1A, the first switch element S1 is provided between the touch electrodes E13 and E9, the first switch element S2 is provided between the touch electrodes E9 and E5, the first switch element S3 is provided between the touch electrode E5 and E1, the first switch element S4 is provided between the touch electrodes E1 and E2, the first switch element S5 is provided between the touch electrodes E2 and E3, the first switch element S6 is provided between the touch electrodes E3 and E4, the first switch element S7 is provided between the touch electrodes E4 and E8, the first switch element S8 is provided between the touch electrodes E8 and E12, the first switch element S9 is provided between the touch electrodes E12 and E11, the first switch element S10 is provided between the touch electrodes E11 and E10, the first switch element S11 is provided between the touch electrodes E10 and E6, the first switch element S12 is provided between the touch electrodes E6 and E7, and the first switch element S13 is provided between the touch electrodes E7 and E11.

The control electrode of each of the first switch elements S1-S13 is respectively coupled to the first signal terminal G1, such that each of the first switch elements S1-S13 can be turned on or off according to the first signal from the first signal terminal G1. In a state in which all of the first switch elements S1-S13 are turned on, the corresponding touch electrodes E13, E9, E5, E1, E2, E3, E4, E8, E12, E11, E10, E6, and E7 among the touch electrodes E1-E16 can be connected via the first switch elements S1-S6 to form a coil. In the embodiments of the present disclosure, a coil refers to a line formed into a winding that can be used as an antenna for receiving or transmitting signals, particularly a near field communication (NFC) antenna.

The touch panel 100A shown in FIG. 1A can be used for a self-capacitive touch panel, and the touch electrodes can be self-capacitive touch electrodes.

Although as an example, 16 touch electrodes and 13 first switch elements are shown in FIG. 1A, those skilled in the art should know that the numbers of the touch electrodes and the first switch elements are not limited thereto. Moreover, the number and positions of the first switch elements can be set as required to form different coils.

In an embodiment of the present disclosure, the switch elements on the touch panel may be implemented with transistors, wherein the transistors may be N-type transistors or P-type transistors. Specifically, the transistors may be N-type or P-type field effect transistors (MOSFETs), or N-type or P-type bipolar transistors (BJTs). In an embodiment of the present disclosure, a gate of a transistor can be referred to as a control electrode. Since a source and a drain of a transistor are symmetrical, the source and the drain are not distinguished, that is, the source of the transistor can be the first electrode (or the second electrode), and the drain can be the second electrode (or the first electrode). Further, any controlled switch device having a gating signal input can be used to implement the function of the transistor. A controlled middle terminal of a switch device for receiving a control signal (e.g., for turning on and off the controlled switch device) can be referred to as a control electrode, and the other two terminals can be referred to as a first electrode and a second electrode, respectively.

In addition, the touch panel may include a display circuit in which a transistor (TFT) is provided. In an embodiment of the present disclosure, the transistor (TFT) in the display circuit can be used as the switch elements for connecting the touch electrodes. Therefore, the touch panel can maintain the existing structure without adding additional processes.

Figure 1B:
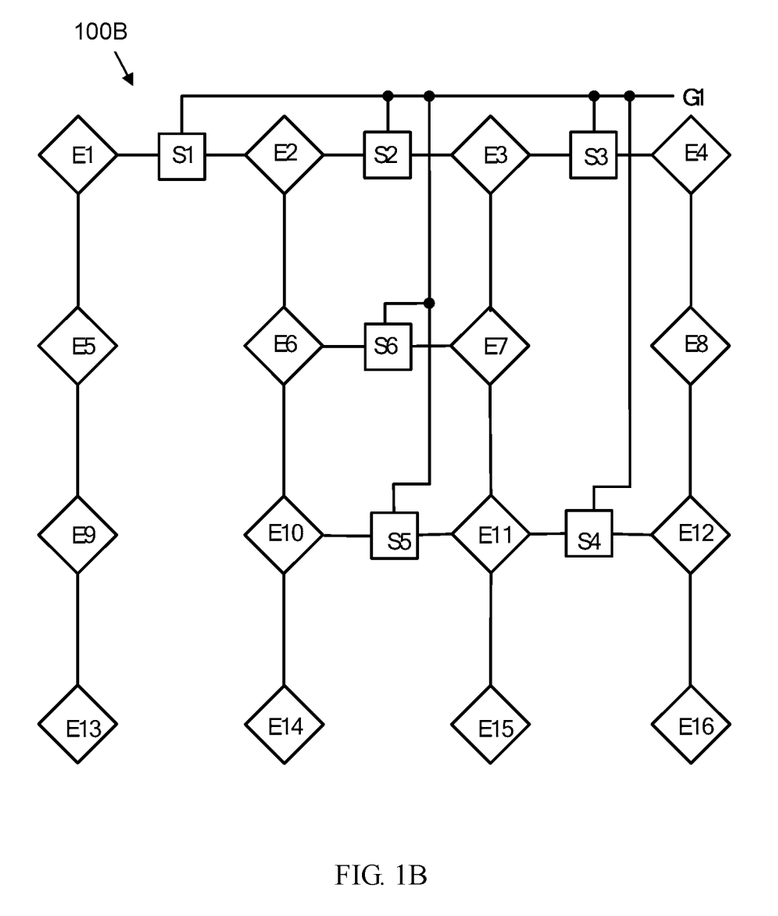
FIG. 1B is a schematic diagram of a touch panel according to another embodiment of the present disclosure.

FIG. 1B shows a schematic diagram of a touch panel 100B according to another embodiment of the present disclosure. As shown in FIG. 1B, the touch panel is provided with a plurality of touch electrodes and at least one first switch element. The plurality of touch electrodes may include a plurality of driving touch electrodes and a plurality of sensing touch electrodes, each first switch element being provided between two driving touch electrodes, between two sensing touch electrodes, or between one driving touch electrode and one sensing touch electrode.

In this example, the touch panel is provided with 16 touch electrodes E1-E16 and six first switch elements S1-S6. In FIG. 1B, the touch electrodes E1-E16 are represented by diamonds, and the first switch elements S1-S6 are represented by squares.

In this example, the touch electrodes in the same column are connected through signal lines to form a touch electrode line. A driving touch electrode line can be formed by connecting a plurality of driving touch electrodes, and a sensing touch electrode line can be formed by connecting a plurality of sensing touch electrodes. For example, the touch electrodes E1, E5, E9, and E13 may be driving touch electrodes, which are connected to form a driving touch electrode line, and E2, E6, E10, and E14 may be sensing touch electrodes, which are connected to form a sensing touch electrode line.

Further, the first switch elements S1-S6 are respectively provided between two touch electrodes that are not connected through signal lines. Specifically, the first switch element S1 is provided between the touch electrodes E1 and E2, the first switch element S2 is provided between the touch electrodes E2 and E3, the first switch element S3 is provided between the touch electrodes E3 and E4, the first switch element S4 is provided between the touch electrodes E11 and E12, the first switch element S5 is provided between the touch electrodes E1° and E11, and the first switch element S6 is provided between the touch electrodes E6 and E7. The control electrodes of the first switch elements S1-S6 are respectively coupled to the first signal terminal G1, and are turned on or off according to the first signal from the first signal terminal G1. In a state in which all of the first switch elements S1-S6 are turned on, the corresponding touch electrodes E13, E9, E5, E1, E2, E3, E4, E8, E12, E11, E10, E6, and E7 among the touch electrodes E1-E16 are connected via the first switch elements S1-S6 and signal lines, to form a coil.

The touch panel 100B shown in FIG. 1B can be used for a mutual-capacitive touch panel.

Although it is shown in FIG. 1B that the touch electrodes in the same column are connected through signal lines, those skilled in the art should know that the touch electrodes in the same row may also be connected through signal lines. The touch electrodes connected through signal lines may all be driving touch electrodes or may all be sensing touch electrodes.

Figure 2:
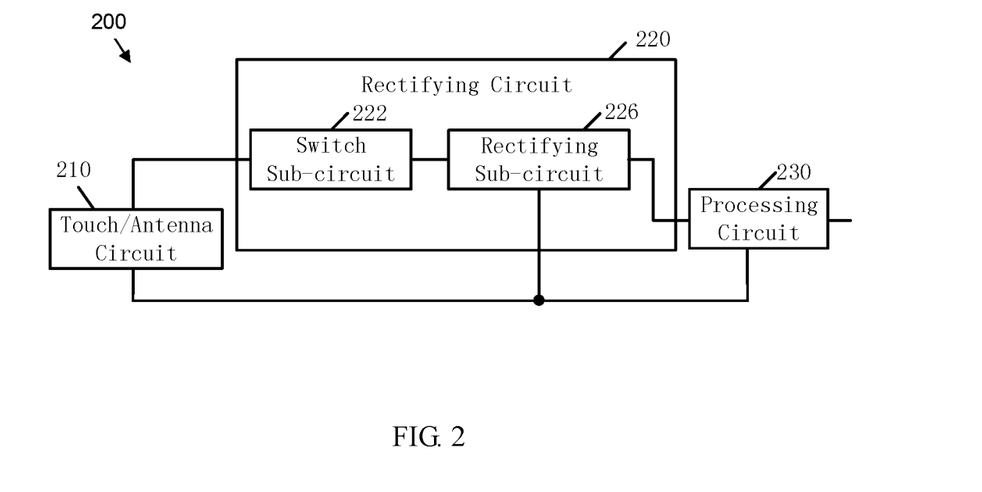
FIG. 2 is a schematic block diagram of a touch panel including a rectifying circuit, according to an embodiment of the present disclosure.

FIG. 2 shows a schematic block diagram of a touch panel 200 according to an embodiment of the present disclosure. The touch panel 200 includes a touch/antenna circuit 210, a rectifying circuit 220, and a processing circuit 230. The touch/antenna circuit 210 may include a plurality of touch electrodes and first switch elements as shown in FIG. 1A or FIG. 1B. The touch/antenna circuit 210 can operate in a touch mode or in an antenna mode. In the touch mode, each of the first switch elements in the touch/antenna circuit 210 is turned off according to the first signal G1. In this way, when the touch panel is touched, the corresponding touch electrodes generate a touch signal, thereby realizing the touch function. In the antenna mode, each of the first switch elements in the touch/antenna circuit 210 is turned on under the control of the first signal G1. Therefore, the corresponding touch electrodes form a connected coil as an antenna, thereby receiving or transmitting a signal. The rectifying circuit 220 can rectify a signal sensed by the touch/antenna circuit 210 according to a second signal from the second signal terminal. In an embodiment of the present disclosure, the rectifying circuit 220 may be, for example, a full-wave rectifying circuit. In this case, the rectifying circuit 220 maintains a positive half-cycle signal in an AC signal sensed by the touch/antenna circuit 210 unchanged, and changes the direction of a negative half-cycle signal but maintains the amplitude thereof unchanged, thereby rectifying the sensed AC signal into a unidirectional signal. The processing circuit 230 can perform data processing on the signal outputted from the rectifying circuit 220, for example, perform analog-to-digital conversion on the outputted signal.

A first input terminal of the rectifying circuit 220 is coupled to a first terminal of the touch/antenna circuit 210, a second input terminal of the rectifying circuit 220 is coupled to a second terminal of the touch/antenna circuit 210, and an output terminal of the rectifying circuit 220 outputs the rectified signal. The rectifying circuit 220 includes a switch sub-circuit 222 and a rectifying sub-circuit 226. The switch sub-circuit 222 couples the first terminal of the touch/antenna circuit 210 to the rectifying sub-circuit 226 according to the second signal G2. The rectifying sub-circuit 226 can rectify the signal sensed by the touch/antenna circuit 210.

A first input terminal of the processing circuit 230 is coupled to the output terminal of the rectifying circuit 220, a second input terminal of the processing circuit 230 is coupled to the second terminal of the touch/antenna circuit 210, and the output terminal of the processing circuit 230 outputs the processed signal to an operating device such as a central processing unit (CPU).

Figure 3:
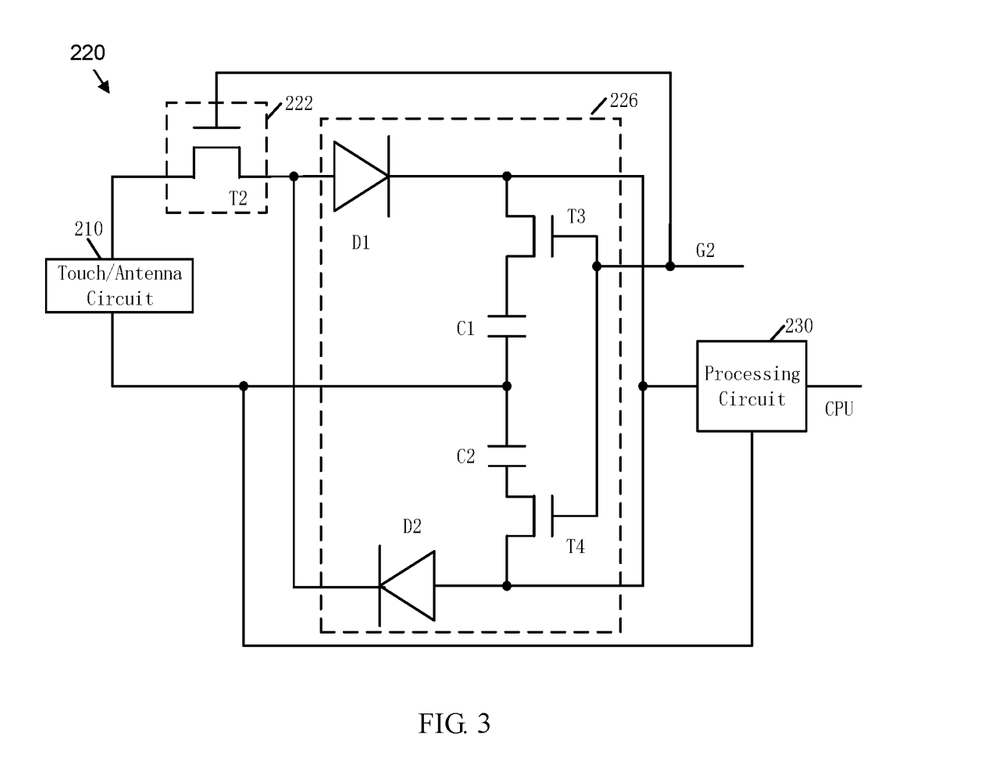
FIG. 3 is an exemplary circuit diagram of a rectifying circuit that can be used in a touch panel according to an embodiment of the present disclosure.

FIG. 3 shows an exemplary circuit diagram of the rectifying circuit 220 for rectifying signals sensed by the touch/antenna circuit 210 described above. In the example, N-type field effect transistors (NMOSs) are employed as the switch elements, and are described in detail. In addition, other types of switch elements can also be used, and the details thereof are not described herein.

In the rectifying circuit 220, the switch sub-circuit 222 includes a second transistor T2, of which a control electrode is coupled to the second signal terminal G2, a first electrode is coupled to the first terminal of the touch/antenna circuit 210, and a second electrode is coupled to the rectifying sub-circuit 226.

The rectifying sub-circuit 226 includes a first diode D1, a first capacitor C1, a second diode D2, and a second capacitor C2. An anode of the first diode D1 is coupled to a second electrode of the second transistor T2, and a cathode of the first diode D1 is coupled to the output terminal of the rectifying circuit 220. A first end of the first capacitor C1 is coupled to the cathode of the first diode D1, and a second end of the first capacitor C1 is coupled to the second terminal of the touch/antenna circuit 210. An anode of the second diode D2 is coupled to the cathode of the first diode D1, and a cathode of the second diode D2 is coupled to the second electrode of the second transistor T2. A first end of the second capacitor C2 is coupled to the anode of the second diode, and a second end of the second capacitor C2 is coupled to the second terminal of the touch/antenna circuit 210.

Further, the rectifying sub-circuit 226 may further include a third transistor T3 and a fourth transistor T4. A control electrode of the third transistor T3 is coupled to the second signal terminal G2, a first electrode of the third transistor T3 is coupled to the cathode of the first diode D1, and a second electrode of the third transistor T3 is coupled to the first end of the first capacitor C1. A control electrode of the fourth transistor T4 is coupled to the second signal terminal G2, a first electrode of the fourth transistor T4 is coupled to the anode of the second diode D2, and a second electrode of the fourth transistor T4 is coupled to the first end of the second capacitor C2. Thus, in the touch mode, transistors T4, T3 are controlled to be turned off, thereby avoiding the impact of the first capacitor C1 and the second capacitor C2 on the touch.

Figure 4:
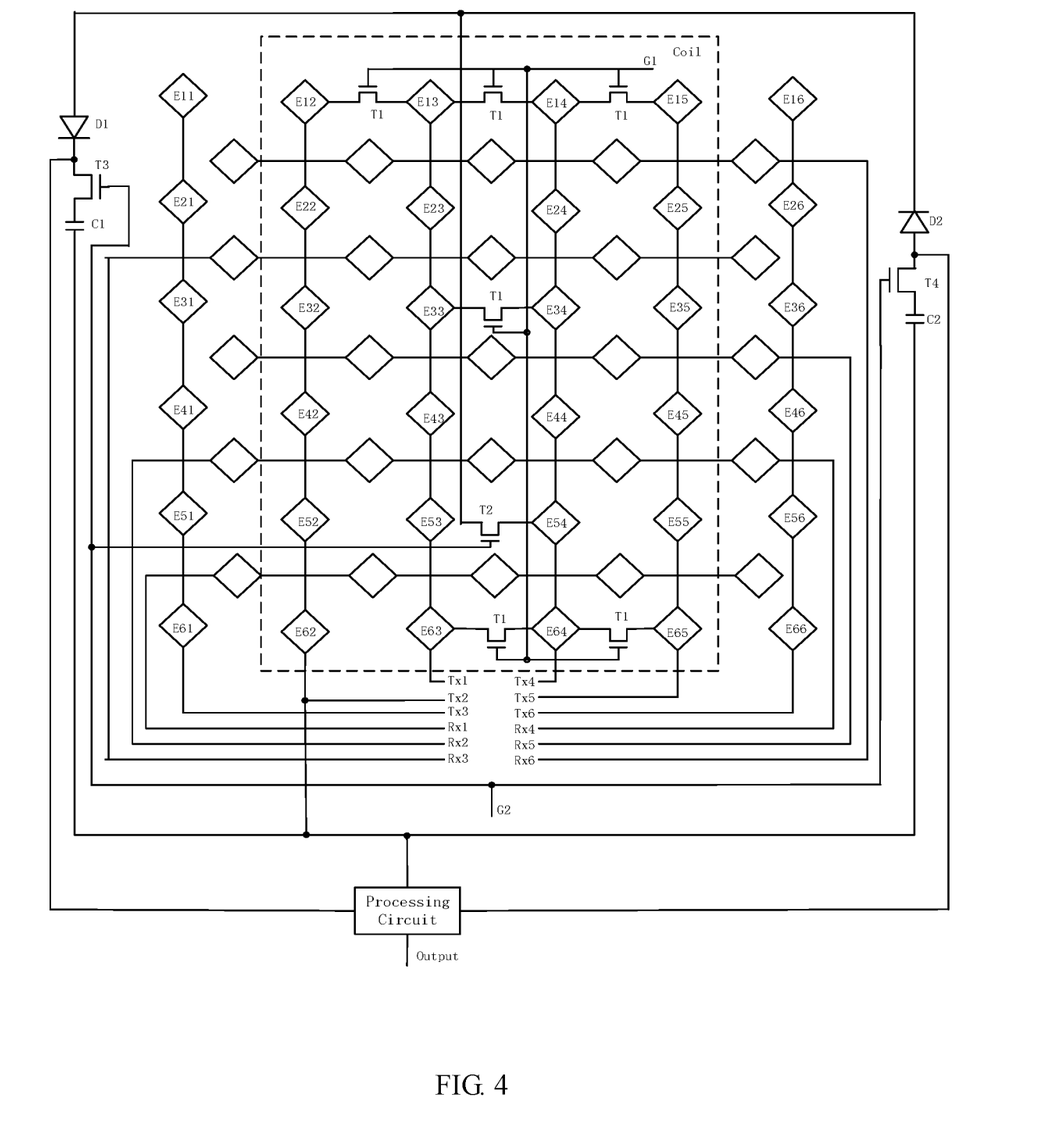
FIG. 4 is a schematic structural diagram of a touch panel according to an embodiment of the present disclosure.

FIG. 4 shows a schematic structural diagram of a touch panel according to an embodiment of the present disclosure. In the example, N-type field effect transistors (NMOSs) are still employed as the switch elements. The touch panel shown in FIG. 4 is a mutual-capacitive touch panel, wherein six transmitting electrodes (TX1-TX6) are respectively coupled to the driving touch electrodes via longitudinal signal lines to form a transmitting touch electrode line. Six receiving electrodes (RX1-RX6) are respectively coupled to the sensing touch electrodes via lateral signal lines to form a receiving touch electrode line. The touch electrodes can be made into a diamond shape during the manufacturing process. Further, the shape of the touch electrodes is not limited thereto, and may be a square, an I-shape or the like. The touch electrodes can be made of an indium tin oxide (ITO) material.

As an example, the driving touch electrodes on the transmitting touch electrode line are indicated with row numbers (1-6) and column numbers (1-6), for example, E11-E66. The first transistors T1 are respectively provided between the driving touch electrodes E12 and E13, between E13 and E14, between E14 and E15, between E64 and E65, between E63 and E64, and between E33 and E34. The control electrode of each of the first transistors T1 is coupled to the first signal terminal G1. Therefore, when the first signal of the first signal terminal G1 is at a high level, each of the first transistors T1 is turned on, and the driving touch electrodes E62, E52, E42, E3, E22, E12, E13, E14, E15, E25, E35, E45, E55, E65, E64, E63, E53, E43, E33, E34, E44, and E54 are connected via signal lines and the six first transistors T1, so as to form a coil. In this situation, the driving touch electrode E54 is configured as the first terminal of the coil, and the driving touch electrode E62 is configured as the second terminal of the coil.

It should be noted that, in the embodiment of the present disclosure, there is no limitation for the touch electrodes constituting the coil. Any touch electrodes provided on the touch panel can be used. For example, the touch electrodes are not limited to the driving touch electrodes on the transmitting touch electrode line, and can also be the sensing touch electrodes on the receiving touch electrode line or a combination of the touch electrodes on the two lines. In addition, the embodiment of the present disclosure is also applicable to a self-capacitive touch panel, on which only a receiving touch electrode line is provided. In this structure, the connection manner of the touch electrodes is the same as the above connection manner, and will not be described again.

In FIG. 4, the specific connecting manner of the second transistor T2, the third transistor T3, the fourth transistor T4, the first capacitor C1, the second capacitor C2, the first diode D1, and the second diode D2 in the rectifying circuit is the same as that in FIG. 3 and will not be described again. Further, the second transistor T2, the third transistor T3, the first diode D1, the first capacitor C1, the fourth transistor T4, the second diode D2, and the second capacitor C2 may be formed simultaneously with the touch panel.

In an embodiment of the present disclosure, the first diode D1 and the second diode D2 are provided outside the touch area of the touch panel. Thus, when the touch panel is used in combination with the display panel, the impact of the optical characteristics of a display device in the display panel on the unidirectional continuity of the diodes can be avoided. In addition, the first capacitor C1 and the second capacitor C2 can be provided outside the touch area of the touch panel. Otherwise, the material layers of the touch panel can be used to form the first capacitor C1 and the second capacitor C2, to integrate the capacitors into the touch area of the touch panel.

As described above, in the case that the touch panel has a display circuit, the transistors (TFTs) provided in the display circuit can also be used as the second transistor T2, the third transistor T3, and the fourth transistor T4. In addition, applicable transistors or other type of switch elements can be additionally provided within the touch panel.

The touch panel according to an embodiment of the present disclosure can form an antenna coil by using the touch electrodes on the touch panel. Therefore, it can not only provide touch control but also serve as an antenna.

Figure 5:
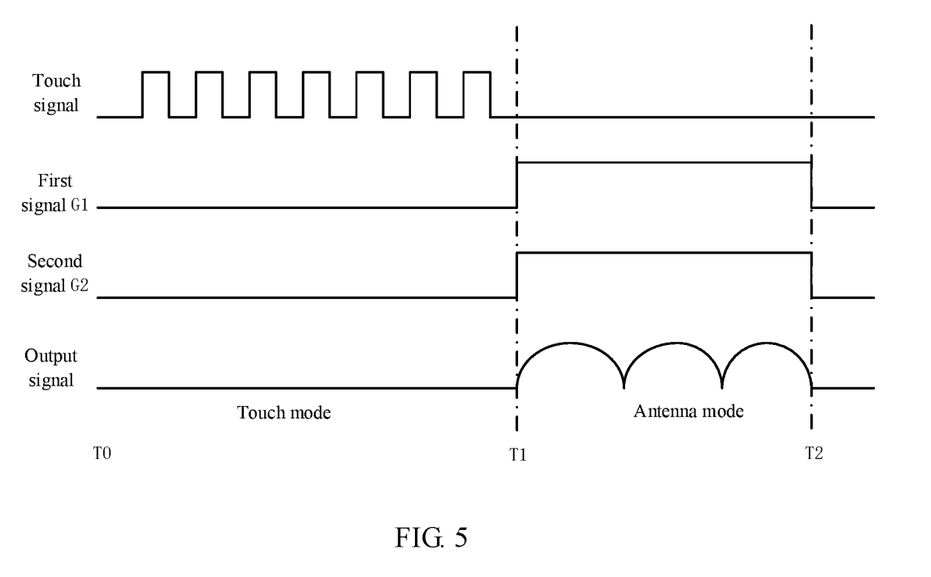
FIG. 5 illustrates a timing diagram of signals for driving a touch panel of an embodiment of the present disclosure.

FIG. 5 shows a timing diagram of signals for driving a touch panel of an embodiment of the present disclosure.

At time T0 to time T1 (touch mode), a touch signal, such as a square wave signal shown in FIG. 5, is provided to the touch electrodes of the touch panel. A first signal G1 at a low level is supplied to the first signal terminal, and a second signal G2 at a low level is supplied to the second signal terminal, so that the transistors connecting the touch electrodes and the transistors in the rectifying circuit are turned off. In this case, the touch panel can perform a touch function, and a low level signal can be outputted from the rectifying circuit and the processing circuit.

At time T1 to time T2 (antenna mode), a first signal G1 at a high level is supplied to the first signal terminal, and a second signal G2 at a high level is supplied to the second signal terminal, so that the transistors connecting the touch electrodes and the transistors in the rectifying circuit are turned on. A connected coil is formed on the touch panel to serve as an antenna. The rectified signal can be outputted from the rectifying circuit.

In the embodiment of the present disclosure, the touch mode and the antenna mode may share the same frame driving timing, and the two modes are alternately and independently executed. In order to improve the performances of the two modes, the frequency of the driving timing can be increased, for example, 120 Hz.

The touch panel according to the embodiment of the present disclosure can implement an antenna coil, and can implement a touch function and an antenna function by employing frequency division, thereby saving space, reducing cost, and not affecting the touch performance.

Figure 6:
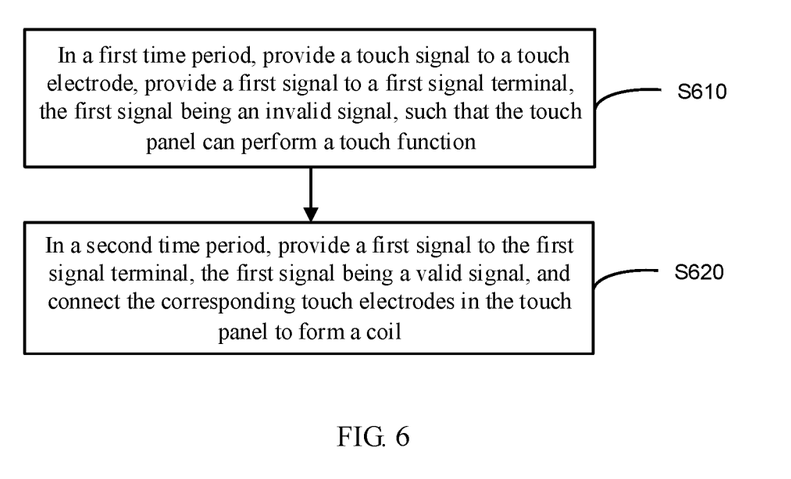
FIG. 6 is a schematic flowchart of a method for driving a touch panel according to an embodiment of the present disclosure.

FIG. 6 shows a schematic flowchart of a method for driving a touch panel as shown in FIG. 1A or FIG. 1B according to an embodiment of the present disclosure. As shown in FIG. 6, in step S610, in a first time period, the touch signal is an operation signal, the first signal is an invalid signal, and the touch panel performs a touch function. Then, in step S620, in the second time period, the first signal is a valid signal, the touch signal is a non-operational signal, and the corresponding touch electrodes in the touch panel are connected to form a coil. In the embodiment of the present disclosure, the valid signal refers to a signal that controls a switch element to turn on, connecting the first and second electrodes of the switch element, and the invalid signal refers to a signal that controls a switch element to turn off, disconnecting the first and second electrodes of the switch element. For example, in the case that the switch elements are N-type transistors, the valid signal is a high level signal and the invalid signal is a low level signal.

Figure 7:
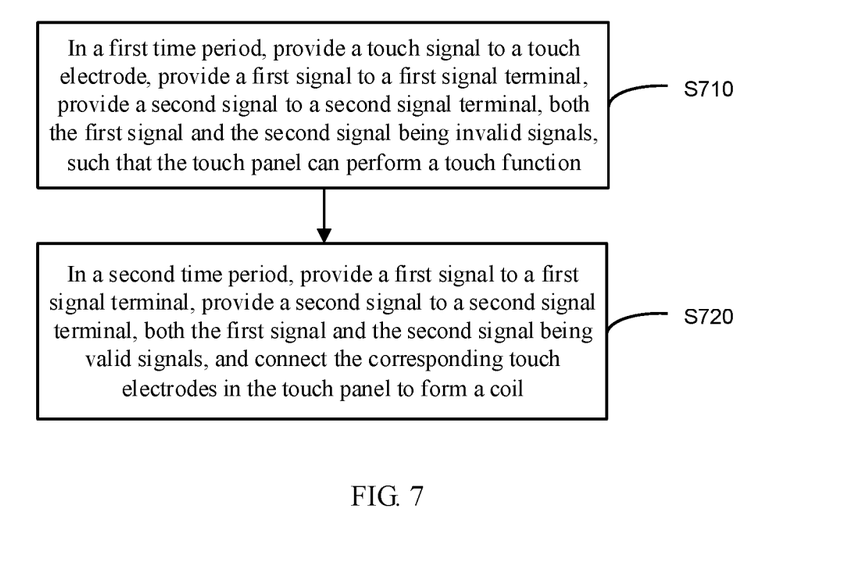
FIG. 7 is a schematic flowchart of a method for driving a touch panel according to an embodiment of the present disclosure.

FIG. 7 shows a schematic flowchart of a method for driving a touch panel as shown in FIG. 4 according to an embodiment of the present disclosure. As shown in FIG. 7, in step S710, in the first time period, the touch signal is an operational signal, the first signal and the second signal are invalid signals, and the touch panel performs a touch function. Then, in step S720, in the second time period, the first signal and the second signal are valid signals, the touch signal is a non-operational signal, the corresponding touch electrodes in the touch panel are connected to form a coil, and the signal sensed by the coil is rectified by the rectifying circuit. As above, the valid signal refers to a signal that controls a switch element to turn on, connecting the first and second electrodes of the switch element, and the invalid signal refers to a signal that controls a switch element to turn off, disconnecting the first and second electrodes of the switch element.

According to an embodiment of the present disclosure, there is further provided a touch device including the above touch panel. The touch device can be, for example, a touch display screen, a mobile phone, a tablet, a camera, a wearable device, or the like.

Several embodiments of the present disclosure have been described in detail above, but the scope of protection of the present disclosure is not limited thereto. Apparently, those of ordinary skill in the art may make various modifications, substitutions or variants to the embodiments of the present disclosure without departing from the spirit and scope of the present disclosure. The scope of protection of the present disclosure is defined by the appended claims.

What is claimed is:

1. A touch panel comprising:
a plurality of touch electrodes;
at least one first switch element, wherein each of the at least one first switch element is provided between two touch electrodes of the plurality of touch electrodes, and is configured to be turned on according to a first signal from a first signal terminal, such that the corresponding touch electrodes of the plurality of touch electrodes are connected via the at least one first switch element to form a coil; and
a rectifying circuit configured to rectify, according to a second signal from a second signal terminal, a signal sensed by the coil, wherein a first input terminal of the rectifying circuit is coupled to a first terminal of the coil, wherein a second input terminal of the rectifying circuit is coupled to a second terminal of the coil, and wherein an output terminal of the rectifying circuit is configured to output the rectified signal;
wherein the rectifying circuit comprises:
a switch sub-circuit configured to couple the first terminal of the coil to a rectifying sub-circuit according to the second signal; and
the rectifying sub-circuit configured to rectify the signal sensed by the coil according to the second signal;
wherein the rectifying sub-circuit comprises a first diode, a first capacitor, a second diode, a second capacitor, a third switch element and a fourth switch element,
wherein an anode of the first diode is coupled to the switch sub-circuit, and wherein a cathode of the first diode is coupled to an output terminal of the rectifying circuit;
wherein a first end of the first capacitor is coupled to the cathode of the first diode, and wherein a second end of the first capacitor is coupled to the second terminal of the coil;
wherein an anode of the second diode is coupled to the cathode of the first diode, and wherein a cathode of the second diode is coupled to the switch sub-circuit;
wherein a first end of the second capacitor is coupled to the anode of the second diode, and wherein a second end of the second capacitor is coupled to the second terminal of the coil;
wherein a control electrode of the third switch element is coupled to the second signal terminal, wherein a first electrode of the third switch element is coupled to the cathode of the first diode, and wherein a second electrode of the third switch element is coupled to the first end of the first capacitor; and
wherein a control electrode of the fourth switch element is coupled to the second signal terminal, wherein a first electrode of the fourth switch element is coupled to the anode of the second diode, and wherein a second electrode of the fourth switch element is coupled to the first end of the second capacitor.

2. The touch panel according to claim 1, wherein the switch sub-circuit comprises a second switch element, wherein a control electrode of the second switch element is coupled to the second signal terminal, wherein a first electrode of the second switch element is coupled to the first terminal of the coil, and wherein a second electrode of the second switch element is coupled to the rectifying sub-circuit.

3. The touch panel according to claim 2, further comprising a display circuit, wherein the second switch element is a switch element in the display circuit.

4. The touch panel according to claim 2, wherein the second switch element is a transistor.

5. The touch panel according to claim 1,
wherein the first diode and the second diode are provided outside a touch area of the touch panel.

6. The touch panel according to claim 1, further comprising a display circuit, wherein at least one of the at least one first switch element, the third switch element, and the fourth switch element is a switch element in the display circuit.

7. The touch panel according to claim 1,
wherein at least one of the at least one first switch element, the third switch element, and the fourth switch element is a transistor.

8. The touch panel according to claim 1, further comprising a processing circuit configured to process a signal outputted by the rectifying circuit,
wherein a first input terminal of the processing circuit is coupled to the output terminal of the rectifying circuit, wherein a second input terminal of the processing circuit is coupled to the second terminal of the coil, and wherein an output terminal of the processing circuit is configured to output the processed signal.

9. The touch panel according to claim 1, wherein the touch electrodes are self-capacitive touch electrodes.

10. The touch panel according to claim 1,
wherein the plurality of touch electrodes comprise a plurality of driving touch electrodes and a plurality of sensing touch electrodes, and
wherein each of the at least one first switch element is provided between two driving touch electrodes, or between two sensing touch electrodes, or between one driving touch electrode and one sensing touch electrode.

11. The touch panel according to claim 10,
wherein at least some of the plurality of driving touch electrodes are connected through signal lines; and
wherein at least some of the plurality of sensing touch electrodes are connected through signal lines.

12. A method for driving the touch panel according to claim 1, the method comprising:
in a first time period, applying a touch signal to a touch electrode of the plurality of electrodes, applying the first signal to the first signal terminal, such that the touch panel can perform a touch function, and providing a second signal to the second signal terminal, wherein the first signal is an invalid signal and wherein the second signal is an invalid signal; and
in a second time period, providing the first signal to the first signal terminal, connecting the corresponding touch electrodes in the touch panel so as to form the coil, and providing the second signal to the second signal terminal, wherein the first signal is a valid signal, and wherein the second signal is a valid signal.

13. A touch device comprising the touch panel according to claim 1.

* * * * *

UNITED STATES PATENT AND TRADEMARK OFFICE
CERTIFICATE OF CORRECTION

PATENT NO. : 11,216,120 B2
APPLICATION NO. : 16/080077
DATED : January 4, 2022
INVENTOR(S) : Cao et al.

Page 1 of 1

It is certified that error appears in the above-identified patent and that said Letters Patent is hereby corrected as shown below:

In the Specification

Column 5, Line 55, delete "electrodes E1° and E11" and insert therefor -- electrodes E10 and E11 --.

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*